(12) United States Patent
Younger

(10) Patent No.: US 6,729,989 B2
(45) Date of Patent: May 4, 2004

(54) METHOD AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 0 days.

(21) Appl. No.: 10/348,846

(22) Filed: Jan. 22, 2003

(65) Prior Publication Data

US 2003/0114262 A1 Jun. 19, 2003

Related U.S. Application Data

(62) Division of application No. 09/796,017, filed on Feb. 28, 2001.
(60) Provisional application No. 60/196,067, filed on Apr. 10, 2000, provisional application No. 60/186,836, filed on Mar. 3, 2000, and provisional application No. 60/186,835, filed on Mar. 3, 2000.

(51) Int. Cl.[7] .............................. F16H 31/00
(52) U.S. Cl. ..................................... 475/129
(58) Field of Search ........................ 475/129

(56) References Cited

U.S. PATENT DOCUMENTS

| | | | | |
|---|---|---|---|---|
| 4,449,426 A | * | 5/1984 | Younger ....................... 74/867 |
| 4,711,140 A | * | 12/1987 | Younger ....................... 74/865 |
| 4,790,938 A | * | 12/1988 | Younger ....................... 210/484 |
| 5,005,441 A | * | 4/1991 | Narita .......................... 74/866 |
| 5,253,549 A | * | 10/1993 | Younger ....................... 74/867 |
| 5,540,628 A | * | 7/1996 | Younger ....................... 475/120 |
| 5,624,342 A | * | 4/1997 | Younger ....................... 475/127 |
| 5,695,423 A | * | 12/1997 | Hirose .......................... 475/129 |
| 5,730,685 A | * | 3/1998 | Younger ....................... 477/156 |
| 5,743,823 A | * | 4/1998 | Younger ....................... 475/120 |
| 5,768,953 A | * | 6/1998 | Younger ....................... 74/606 R |
| 5,820,507 A | * | 10/1998 | Younger ....................... 475/116 |
| 5,967,928 A | * | 10/1999 | Younger ....................... 475/120 |
| 6,074,319 A | * | 6/2000 | Sato et al. ................... 475/120 |
| 6,099,429 A | * | 8/2000 | Younger ....................... 475/120 |
| 6,117,047 A | * | 9/2000 | Younger ....................... 477/130 |
| 6,287,231 B1 | * | 9/2001 | Younger ....................... 475/120 |
| 6,340,160 B1 | * | 1/2002 | Younger ....................... 277/447 |
| 6,390,944 B1 | * | 5/2002 | Younger ....................... 475/127 |

\* cited by examiner

*Primary Examiner*—Dirk Wright
(74) *Attorney, Agent, or Firm*—Mark P. Stone

(57) ABSTRACT

Methods and systems for improving the operation of transmissions for automotive vehicles increase the main line fluid pressure of a "factory installed" transmission to permit shifting of gears at proper time intervals without undesireable side effects including late or delayed shifts. The hydraulic circuitry of a "factory installed" automotive transmission is also modified to increase the accumulator range to improve the quality of a "1-2" shift, and to extend the useful operating life of the transmission. A seal assembly is provided for reducing leakage of transmission fluid, and additional modifications to the hydraulic circuitry of the automotive transmission provide a smooth, quick and positive forward clutch apply circuit, and increase the servo-apply pressure to the intermediate and overdrive servos to increase the holding capacity of the second and fourth bands and to adjust the field of the shift.

7 Claims, 10 Drawing Sheets

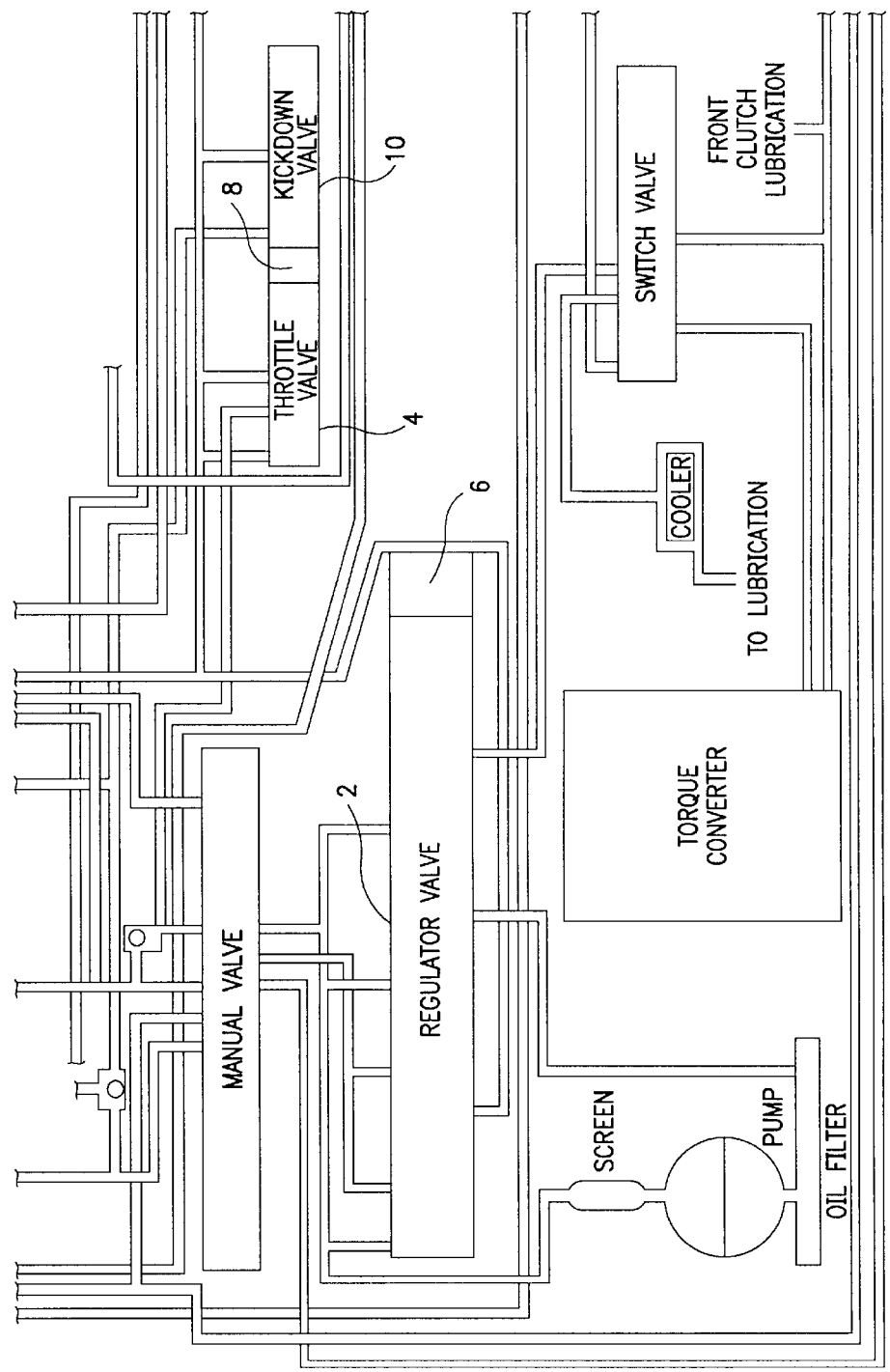
FIG. IC

METHOD AND SYSTEMS FOR IMPROVING THE OPERATION OF TRANSMISSIONS FOR MOTOR VEHICLES

This application is a divisional of U.S. patent application Ser. No. 09/796,017, filed Feb. 28, 2001, and entitled "Methods And Systems For Improving The Operation Of Transmissions For Motor Vehicles", which claims the benefit of U.S. Provisional Application Ser. No. 60/186,836, filed Mar. 3, 2000, U.S. Provisional Application Ser. No. 60/186,835, filed Mar. 3, 2000, and U.S. Provisional Application Ser. No. 60/196,067, filed Apr. 10, 2000.

BACKGROUND OF THE INVENTION

The methods and systems of the present invention are directed to the modification and improvement of transmissions for automotive vehicles of the type installed by original equipment manufacturers. Such transmissions are commonly referred to as "factory installed", and this terminology will be adopted in the following discussion. The invention is particularly directed to the improvement and modification of automotive transmissions commonly known as TFOD-DSL which are installed in vehicles produced by Chrysler Motor Corporation, RE4R01A installed in vehicles produced by Mazda Motors Corporation, and 4R44E/4R55E installed in vehicles produced by the Ford Motor Corporation.

The present inventor owns U.S. Pat. No. 4,449,426 issued on May 22, 1984; U.S. Pat. No. 4,711,140, issued on Dec. 8, 1987; U.S. Pat. No. 4,790,938, issued on Dec. 13, 1988; U.S. Pat. No. 5,253,549, issued on Oct. 19, 1993; U.S. Pat. No. 5,540,628, issued on Jul. 30, 1996; U.S. Pat. No. 5,624,342, issued on Apr. 29, 1997; U.S. Pat. No. 5,730,685, issued on Mar. 24, 1998; U.S. Pat. No. 5,743,823, issued on Apr. 28, 1998; U.S. Pat. No. 5,768,953 issued on Jun. 23, 1998; U.S. Pat. No. 5,820,507 issued on Oct. 13, 1998; U.S. Pat. No. 5,967,928 issued on Oct. 19, 1999; U.S. Pat. No. 6,099,429 issued on Aug. 8, 2000; U.S. Pat. No. 6,117,047 issued on Sep. 12, 2000. The disclosures of these patents are expressly incorporated by reference herein.

In the factory installed TFOD-DSL automotive transmission Applicant has recognized that when this transmission is subjected to severe operating conditions, it lacks the necessary torque capacity to prevent slipping of gears. Although an increase in mainline pressure will correct the slipping, merely increasing the line pressure will result in undesirable side effects such as late shifting or no upshifting under wide open throttle conditions.

With regard to the factory installed RE4R01A automotive transmission, Applicant has recognized that modification of the hydraulic circuitry of this transmission can extend the range of accumulator pressure from about 70 psi to 150 psi or greater. Extending the range of accumulator pressure will result in improvement to the quality of the "1-2" shift and also will extend the operating life of the transmission. Applicant has also recognized that the seal assembly of the RE4R01A automotive transmission is arranged in a manner in which leakage of transmission fluid can occur during operation of the transmission resulting in clutch plate slippage which adversely affects the operation of the transmission.

With regard to the 4L44E/4R55E automotive transmission, Applicant has recognized that forward movement of the vehicle relies upon several different cooperating components including a power train control module, an EPC (electronic pressure control) solenoid for regulating pressure, and the ability of a forward modulator valve to regulate a forward engagement control valve. The failure of any of these components of this automotive transmission can result in loss of forward movement of the vehicle.

It is the object of the present invention to eliminate the aforementioned disadvantages of the known factory installed automotive transmissions. In particular, the primary objects of the present invention include increasing the main line pressure of the factory installed TFOD-DSL automotive transmission without resulting in the undesireable side effects including late shifts and no upshifts during wide open throttle conditions; modifying the hydraulic circuitry of the factory installed RE4R01A automotive transmission to extend the range of accumulator pressure from 70 psi to 150 psi or greater for improving the quality of the "1-2" shift and for extending the useful life of the automotive transmission; improving the sealing assembly of the factory installed RE4R01A automotive transmission to prevent leakage of fluid and slippage and burnout of the clutch plate; modifying the hydraulic circuitry of the factory installed 4R44E/4R55E automotive transmission for providing a smooth, quick and positive forward clutch apply circuit that is reliable and controlled exclusively by movement of the shift control lever, and increasing the servo apply pressure to the intermediate and overdrive servos for increasing the holding capacity of the second and fourth gear bands and for providing means for adjusting the feel of the shift (e.g., softer or firmer) to suit the needs of a particular driver or vehicle.

Other objects and advantages of the present invention will become apparent to those skilled in the art from the following discussion.

SUMMARY OF THE INVENTION

In a first aspect of the present invention, a factory installed TFOD-DSL automotive transmission is modified to increase the main line pressure from a maximum of approximately 95 psi to 120 psi or greater by replacing the original pressure regulator spring to exert an increased resilient force on the pressure regulator valve. The regulator valve feeds main line pressure to the throttle valve, and when the throttle valve is opened mechanically, the throttle pressure corresponds to the main line pressure. By increasing the resilient force applied by the pressure regulator spring to the pressure regulator valve, the throttle pressure is increased, thereby increasing main line pressure. Increasing the main line pressure increases the torque capacity of the transmission which tends to prevent slipping of gears and soft shifts. However, in order to avoid undesirable side effects of increased pressure including late shifts or no upshift during wide open throttle, the size of the throttle valve is adjusted (decreased) to avoid direct contact between the throttle valve and a kickdown valve at above approximately ⅞th of wide open throttle operation. By avoiding direct contact between the kickdown valve and the throttle valve above ⅞th throttle condition, the throttle valve is not opened mechanically by the kickdown valve, but instead, the throttle valve spring continues to regulate both the throttle pressure and the corresponding main line pressure through wide open throttle. In this manner, the undesirable side effects of increased main line pressure, including late shifts and no upshift at wide open throttle, are avoided.

In a further embodiment of the present invention, the hydraulic circuitry of the factory installed RE4R01A automotive transmission is modified to increase the accumulator pressure from approximately 70 psi to approximately 150 psi or greater. Extending the pressure range of the accumulator results in a better quality of shift of the 1-2 shift valve and extends the useful life of the transmission including the second gear bands.

In a further embodiment of the present invention, the sealing assembly of the factory installed RE4R01A automotive transmission is modified to prevent leakage and extend the useful life of the seal. The modification to the factory installed sealing system includes mounting a wire retaining element around the outer surface of a seal element mounted around the outer surface of a rotatable shaft to increase the inwardly directed force applied to the seal pressing it against the shaft, and to counteract centrifugal forces applied to the seal tending to displace the seal away from the shaft as the shaft rotates.

In a further embodiment of the present invention, the hydraulic circuitry of a factory installed 4R44E/4R55E automotive transmission is modified to provide a smooth, quick and forward clutch apply circuit that is reliable and is controlled exclusively by movement of the shift control lever and not by the power train control module, the EPC regulating solenoid, the availability of the forward modulator valve to regulate a forward engagement control valve, or the ability of a forward clutch circuit to rapidly attain a pressure of 40 psi. The hydraulic circuitry of the factory installed 4R44E/4R55E automotive transmission is further modified to increase servo apply pressure to the intermediate and overdrive servos for increasing the holding capacity of the second and fourth gear bands and to provide means for adjusting the feel of the shift (e.g., soft or firm) to suit a particular driver or vehicle, as desired.

BRIEF DESCRIPTION OF THE DRAWINGS

FIGS. 1A–1D illustrate a diagram of the hydraulic circuitry of a factory installed TFOD-DSL automotive transmission, modified in accordance with the present invention;

DESCRIPTION OF THE BEST MODES FOR CARRYING OUT THE INVENTION

Figure 1A:
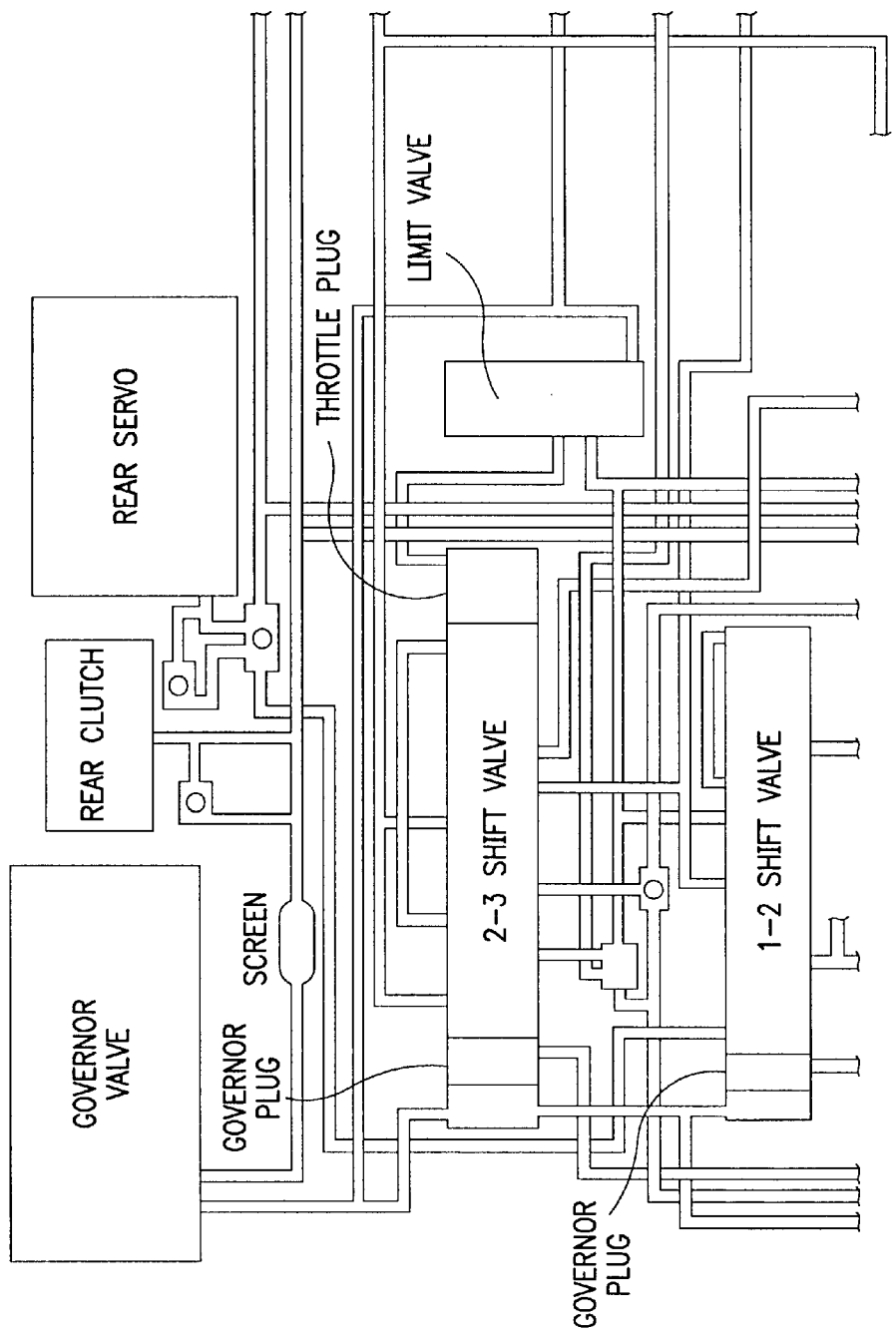
Figure 1B:
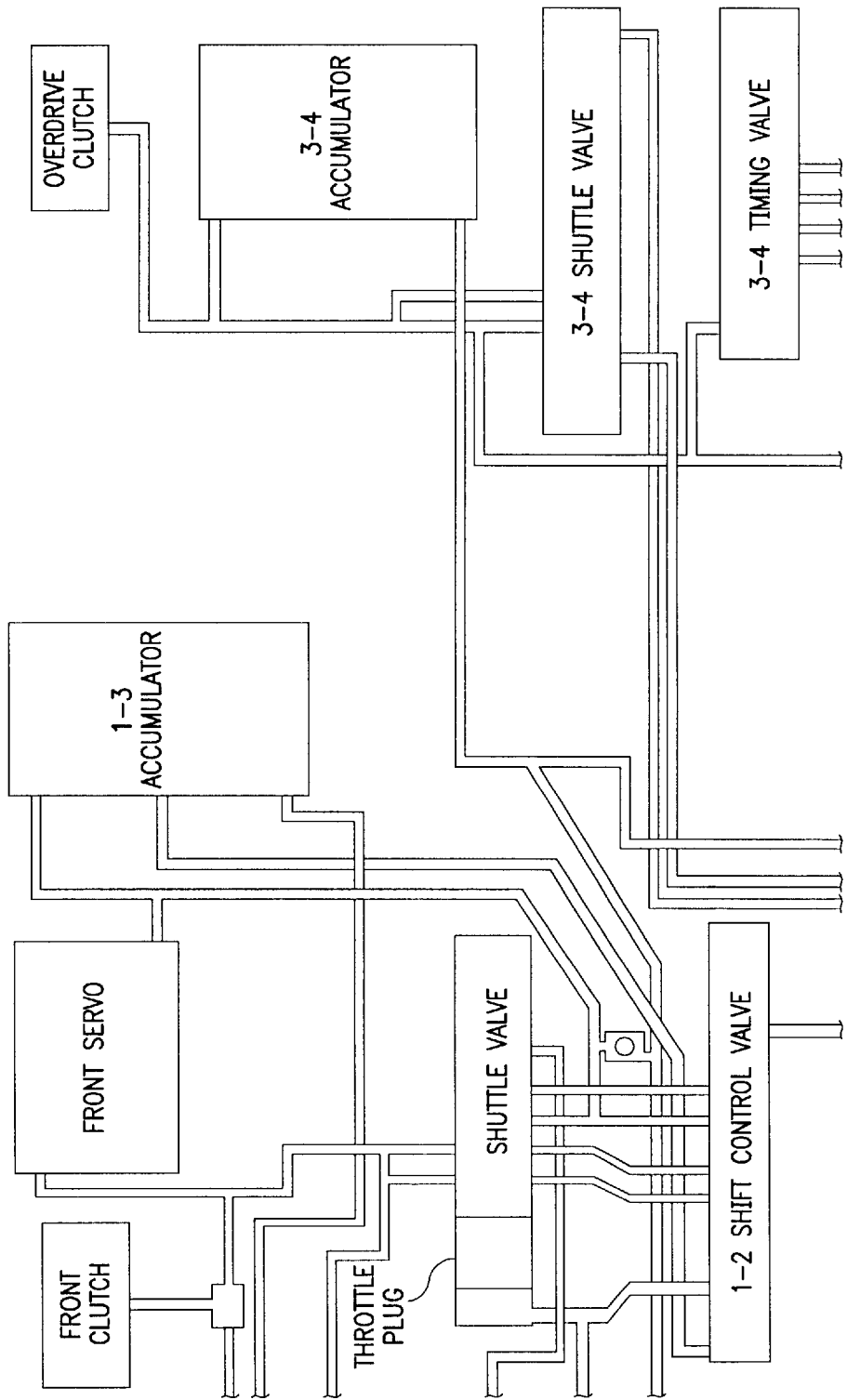
Figure 1D:
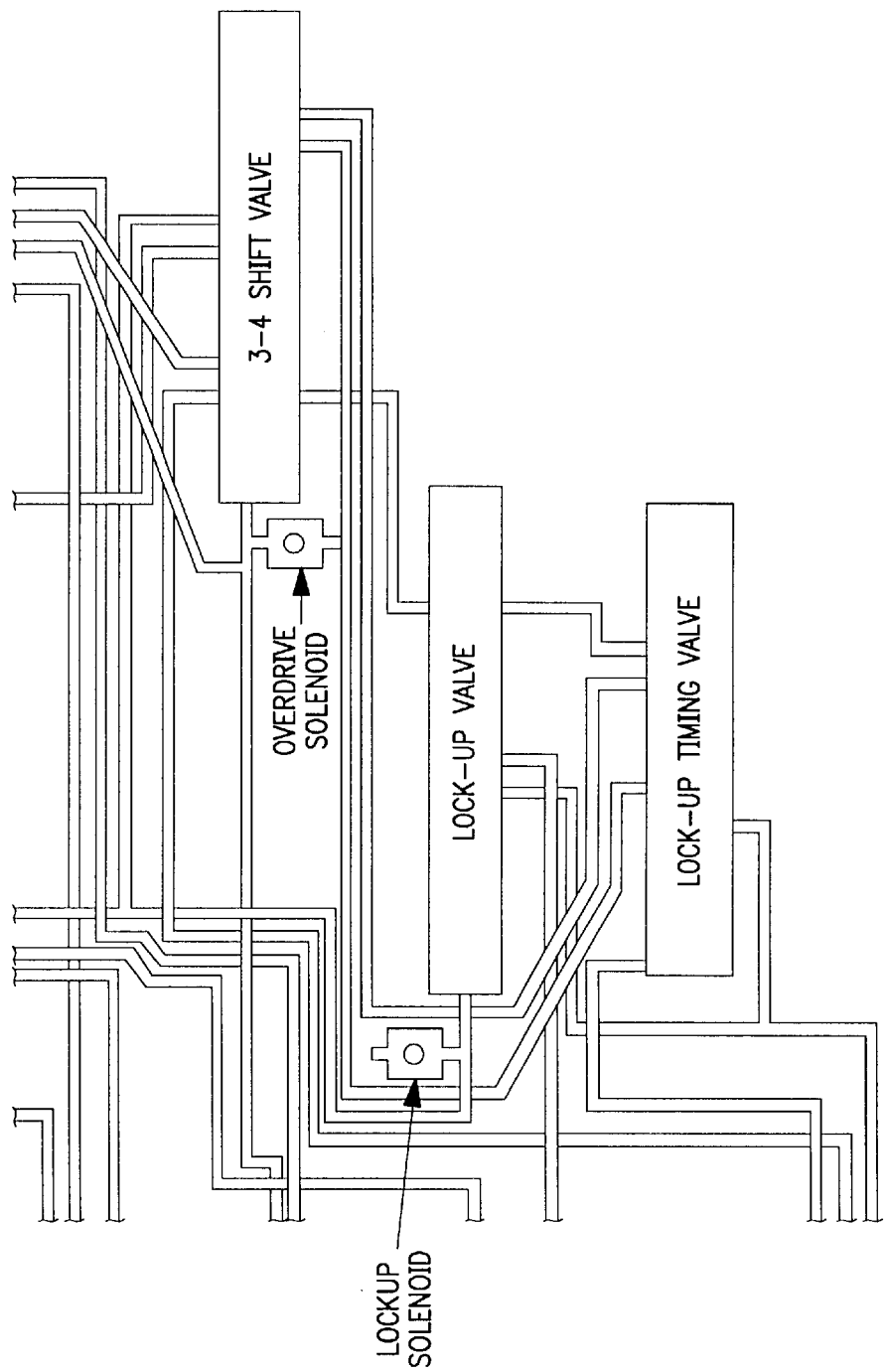
Figure 2A:
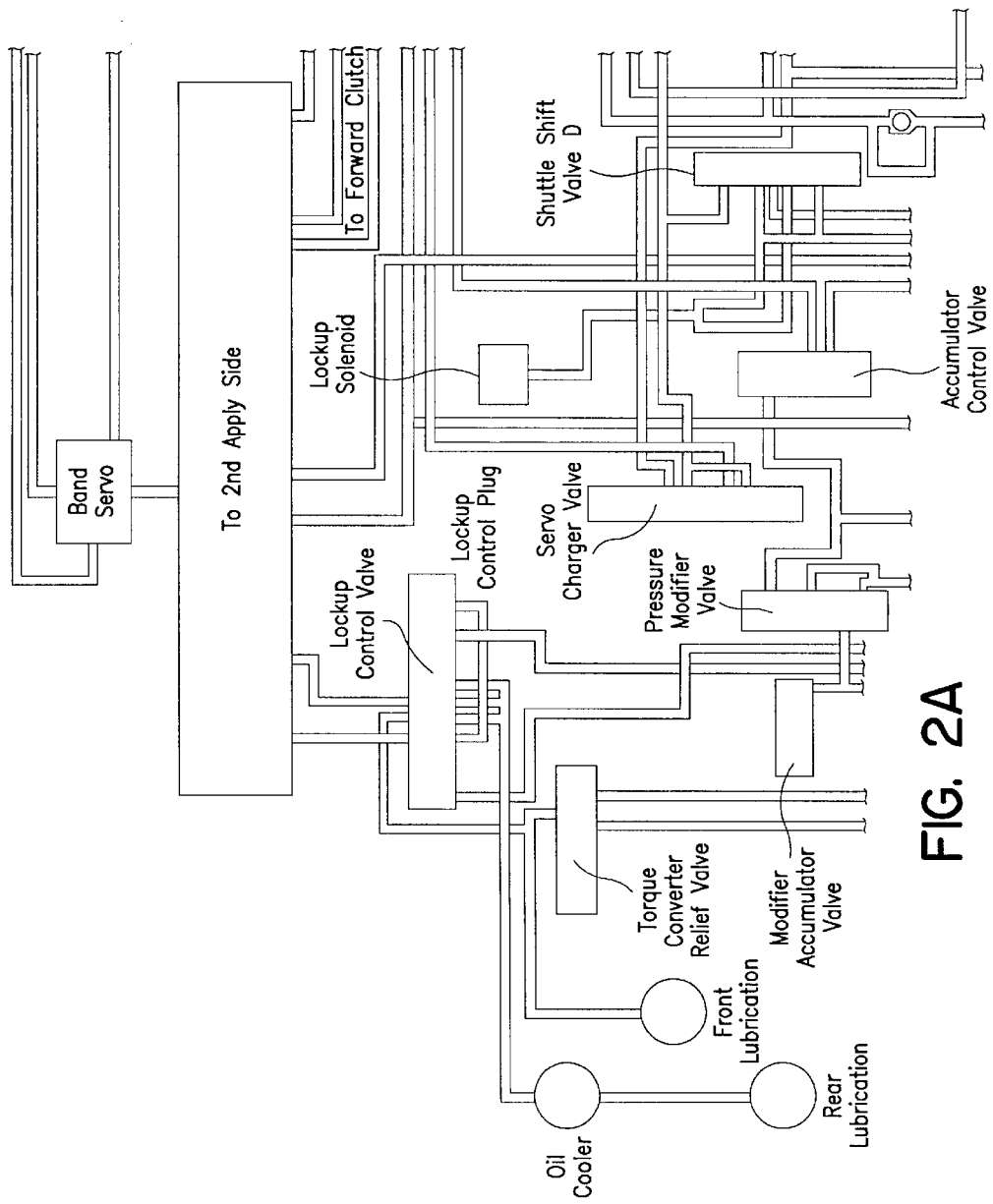
FIGS. 2A–2D illustrate a diagram of the factory installed RE4R01A automotive transmission, modified in accordance with the present invention.
Figure 2B:
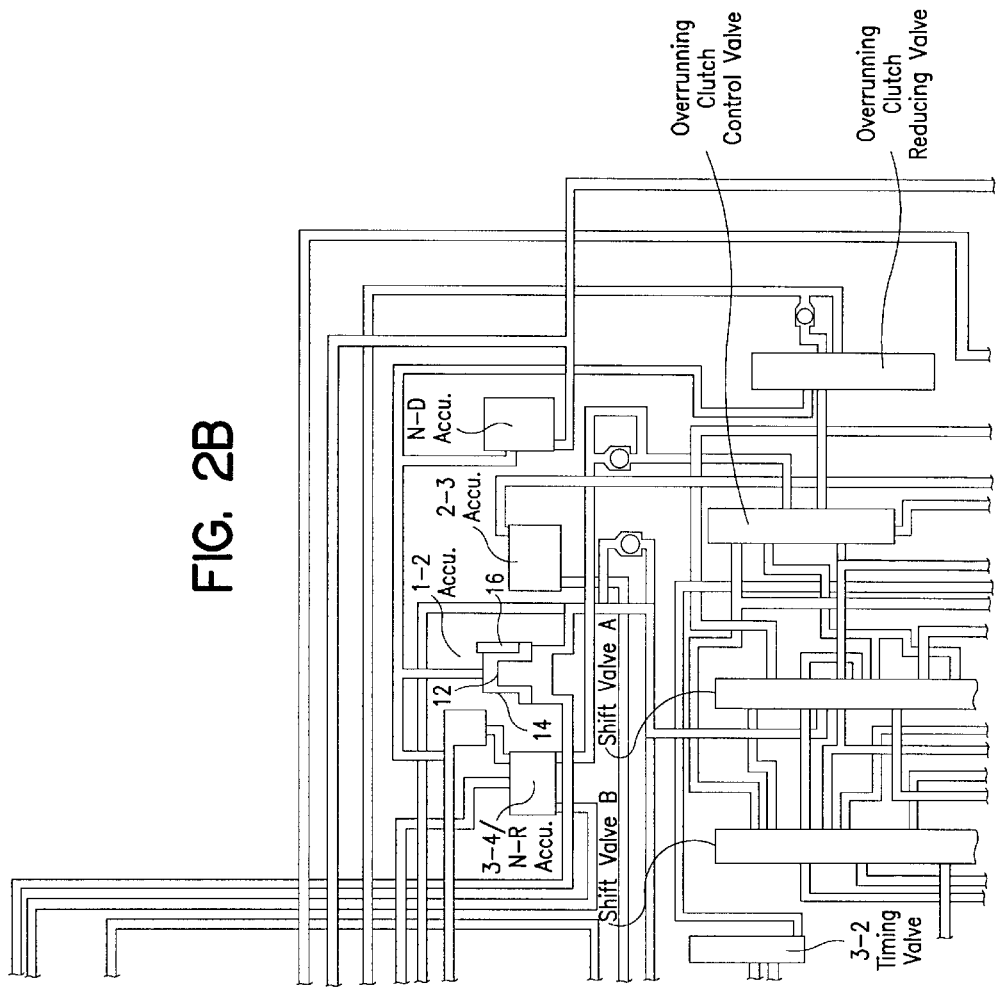
Figure 2C:
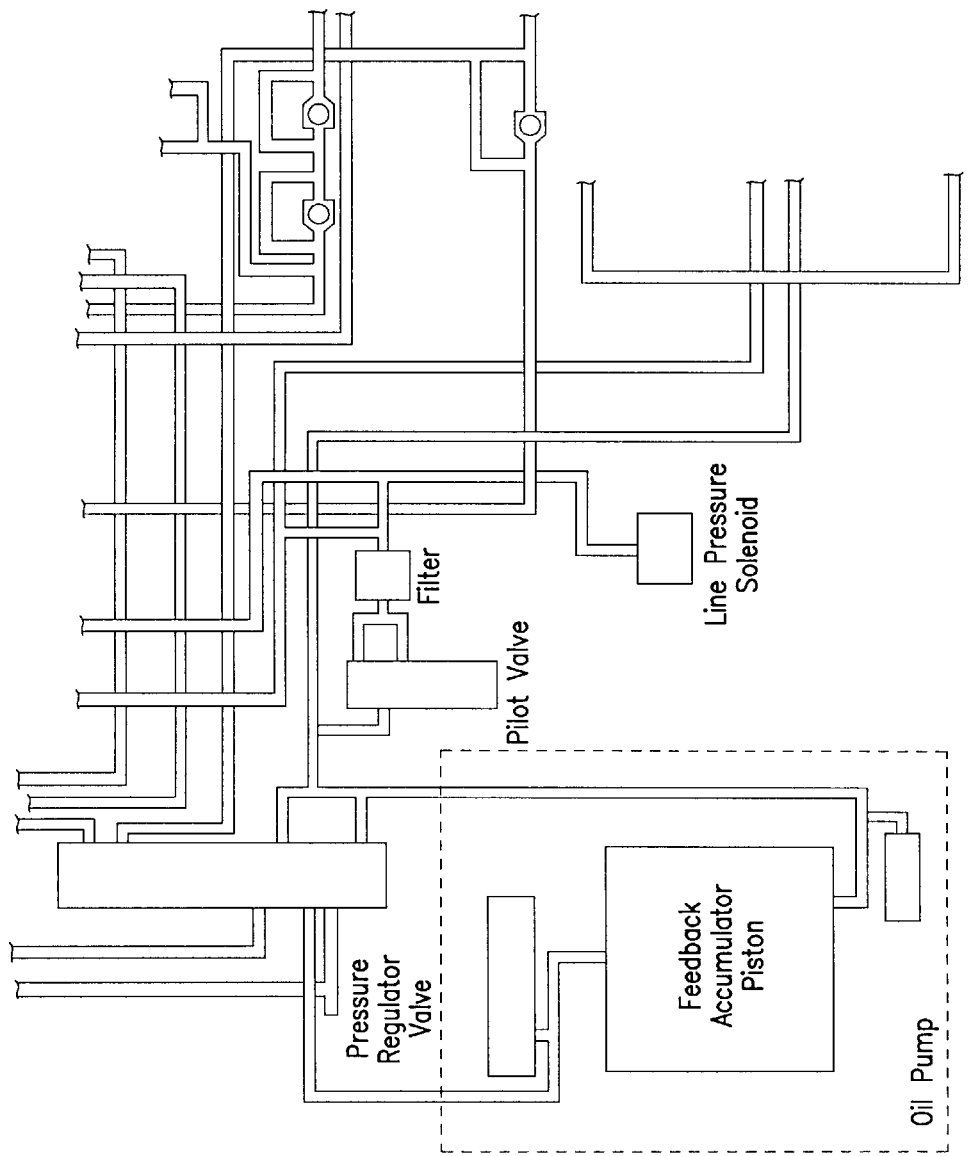
Figure 2D:
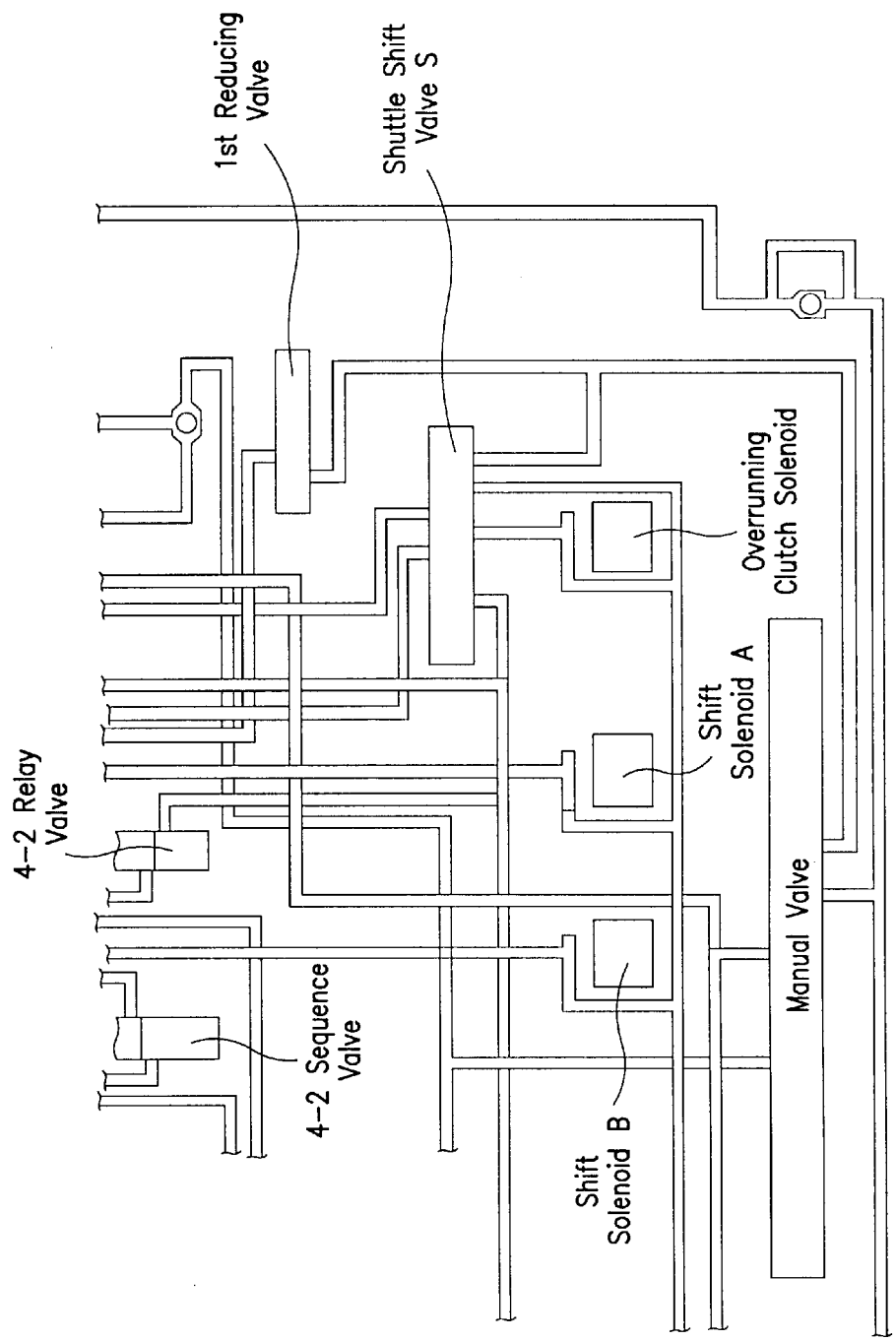

FIGS. 1–4 of the drawing illustrate improvements to automotive transmissions in accordance with the present invention. These improvements include modifications to the hydraulic circuitry of the factory installed transmissions to improve the efficiency and performance of the transmissions, and modifications to the sealing assembly of factory installed automotive transmissions to reduce or prevent leakage of transmission fluid and avoid damage to the transmission resulting from such leakage.

Referring to FIGS. 1A–1D, the hydraulic circuitry of a factory installed TFOD-DSL automotive transmission, as modified in accordance with the present invention, is illustrated. The operation of this factory installed transmission is well known to those skilled in the automotive transmission art, and will not be discussed in detail herein. In accordance with the present invention, a regulator valve designated by reference numeral 2 feeds main line pressure to a throttle valve, designated by reference numeral 4. A pressure regulator spring, designated by reference numeral 6, applies a resilient force against movement of the regulator valve in a leftward direction as viewed in FIG. 1C. In the factory installed transmission, the regulator spring 6 is selected to produce a main line pressure of 95 pounds per square inch (psi), which is fed via the hydraulic circuitry of the transmission, to the throttle valve 4. Operation of the transmission at a main line pressure of 95 psi results in insufficient torque capacity causing slipping of gears and soft shifts when the vehicle engine is operating near maximum capacity (e.g., wide open throttle). Increasing the main line pressure will correct the gear slippage problem, but may cause undesirable side effects including late shifts or no upshifts during wide open throttle operation.

In accordance with the present invention, the hydraulic circuitry of the TFOD-DSL automotive transmission is modified to increase the mainline pressure, but to also make additional adjustments to avoid any potential undesirable side effects. The pressure regulator spring 6 of the factory installed transmission is replaced with a stronger pressure regulator spring to result in a main line pressure of 120 psi or greater fed from the regulator valve 2 to the throttle valve 4. Accordingly, the main line pressure at wide open throttle conditions is 120 psi or greater, thereby preventing the undesireable side effects of gear slippage and soft shifts when the engine is operating near maximum capacity (i.e., near wide open throttle operation). The hydraulic circuitry is further modified to avoid any undesirable side effects, such as late shifts or no upshifts during wide open throttle operation, resulting from the increase in maximum main line pressure. In the factory installed transmission, throttle valve pressure delays shifting. A plunger, shown as kickdown valve 10, acts on a throttle valve spring designated by reference numeral 8, which in turn drives the throttle valve 4. From approximately light throttle operation to about ⅞th full throttle operation, line pressure is regulated by continually increasing the compression of the throttle valve spring 8 resulting from the leftward movement of the kickdown valve 10 in the direction shown in FIG. 1C which continually increases the resilient force applied to the throttle valve by the throttle valve spring.

At engine operation above ⅞th throttle condition, the left end of the kickdown valve 10 directly contacts the right end of the throttle valve 4, thereby preventing any further increase of the resilient force exerted by the throttle valve spring on the throttle valve, as the throttle valve continues to be driven leftwardly by the kickdown valve.

In order to avoid this problem, the factory installed TFOD-DSL is modified so that the size of the throttle valve relative to the kickdown valve is adjusted so the kickdown valve will not directly engage the throttle valve even at engine operation above ⅞th full throttle condition. Preferably, this modification is accomplished by shortening the length of the throttle valve of the factory installed automotive transmission. In this manner, the throttle valve spring exerts a continually increasing resilient force on the throttle valve, even near wide open throttle operation.

Therefore, in accordance with one aspect of the present invention, the factory installed TFOD-DSL automotive transmission is modified to increase main line pressure to avoid slipping of gears and soft shifts during engine operation near wide open throttle conditions, and is further modified to prevent undesirable side effects including late shifts and no upshift at wide open throttle by adjusting the relative sizes of the throttle valve and the kickdown valve such that a continuously increasing resilient force is applied to the throttle valve by the throttle valve spring throughout the operating range of the vehicle engine including wide open throttle operation.

FIGS. 2A–2D of the drawing illustrates a further aspect of the present invention in which the hydraulic circuitry of the factory installed RE4R01A automotive transmission is modified in accordance with the present invention. The operation of this factory installed transmission is known to those skilled in the automotive transmission art, and will not be discussed in detail herein. In the factory installed transmission, the maximum accumulator pressure is approximately 70 psi (pounds per square inch). However, the Applicant has recognized that an increase in the range of accumulator pressure will result in an improvement in the quality of the shift of the 1-2 shift valve and will extend the useful life of the second gear bands of the automotive transmission.

In accordance with the present invention, the range of accumulator pressure is extended from 70 psi in the factory installed transmission to 150 psi. This is accomplished by modifying the 1-2 accumulator, designated by reference numeral 12, to remove an upper seal from the second accumulator piston, designated by reference numeral 14 in FIG. 2B, and by plugging an exhaust opening, designated by reference numeral 16 in FIG. 2B, in the 1-2 accumulator 12 of the factory installed automotive transmission. In this manner, line pressure is applied directly to the 1-2 accumulator, increasing the pressure range of the accumulator from 70 psi to 150 psi. Additional adjustments to the increased accumulator pressure range can be accomplished by installing one or more high rate springs to replace the seal removed from the 1-2 accumulator to exert a resilient force on the 1-2 accumulator.

Extending the pressure range of the 1-2 accumulator results in improvement to the quality of the shift between first and second gear, and increases the useful life of this factory installed automotive transmission.

Figure 3A:
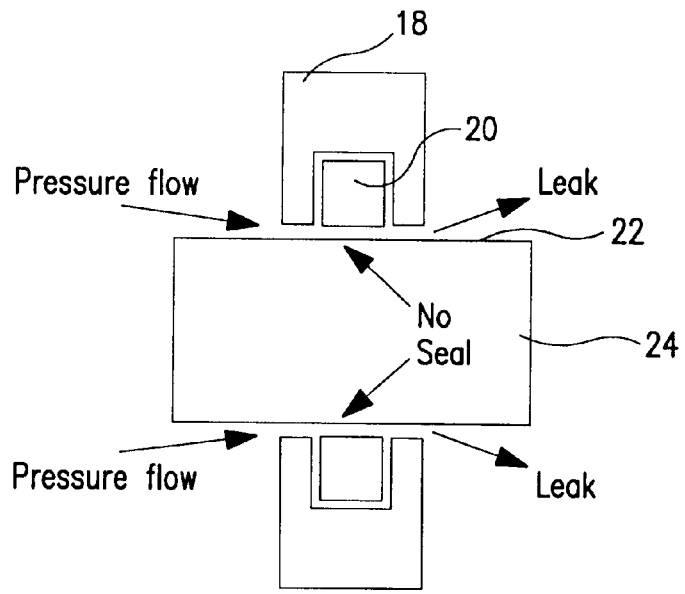
FIG. 3A illustrates the sealing assembly for the direct inner clutch employed in the factory installed RE4R01A automotive transmission.

FIG. 3A illustrates a sealing assembly of the type employed in the factory installed RE4R01A automotive transmission. A piston 18 partially encloses a seal element 20 and exerts an inwardly directed force on the seal towards an outer surface 22 of a rotatable shaft 24. As a result of use, time, temperature and centrifugal forces applied to the seal 20 by the rotating shaft 24, the seal tends to expand outwardly, allowing clearance between the seal and the outer surface 22 of the shaft 24. This clearance results in leakage of fluid, causing slipping of the clutch plate and burnup resulting in the loss of third or fourth gear, and further resulting in serious contamination of the hydraulic circuitry of the automotive transmission as a result of the shredding of the clutch plate friction material.

Figure 3B:
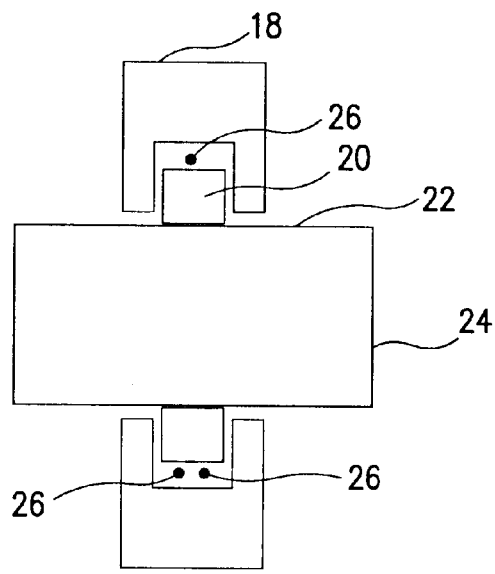
FIG. 3B illustrates improvements to that sealing assembly in accordance with the present invention.

FIG. 3B illustrates improvements to the sealing assembly of the factory installed transmission illustrated by FIG. 3A. In the improvement illustrated by FIG. 3B, one or more retaining elements, preferably contracting wires 26, are disposed between the outer surface of the seal element 20 and an inner surface of the portion of the piston 18 in which the seal element is received. The contracting wire 26 extends around the outer surface of the seal element 20, and exerts an inward force urging the inner surface of the seal element to remain in contact with the outer surface 22 of the rotatable shaft 24. Preferably, the seal is formed from Teflon which is relatively harder and less prone to deformation and wear than typical rubber seals. Also, the seal is preferably formed with an inner diameter that is slightly smaller than the outer diameter of the shaft to assure a contiguously abutting relationship between the inner surface of the seal element and the outer surface of the shaft when the seal is initially mounted around the shaft.

The contracting wires 26 exert an inwardly directed force on the seal to maintain firm contact between the inner surface of the seal and the outer surface of the shaft, and to counteract a portion of the centrifugal force tending to cause the seal to expand outwardly when the shaft is rotated. If any fluid is received in the space between the piston and the seal which accommodates the contracting wire 26, such fluid tends to exert a pressure inwardly against the outer surface of the seal element, thereby supplementing the inwardly directed force provided by the contracting wire 26 to maintain the seal abutting against the outer surface of the shaft in sealing relationship.

Figure 4:
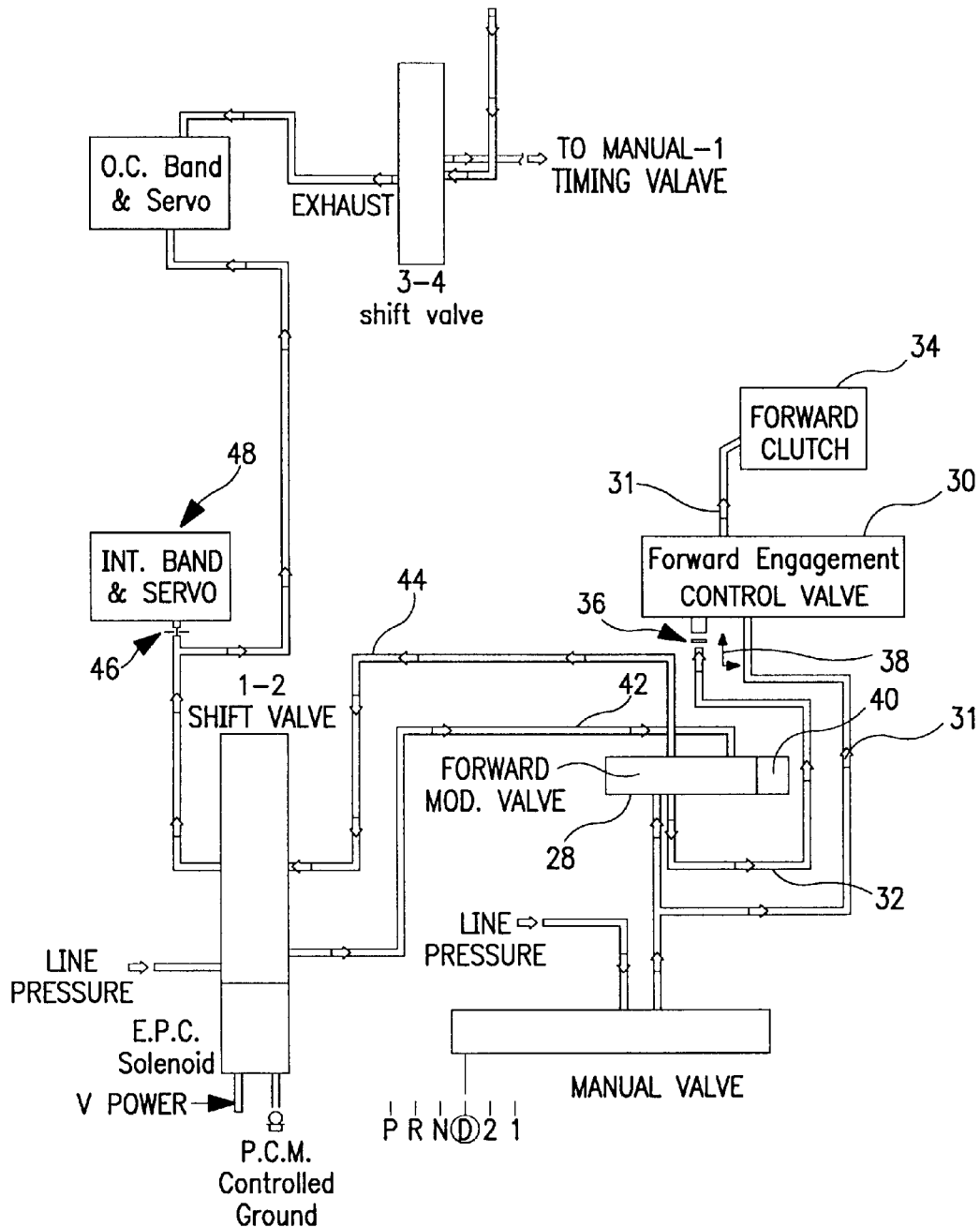
FIG. 4 illustrates the hydraulic circuitry of the factory installed 4R44E/4R55E automotive transmission, modified in accordance with the present invention.

FIG. 4 illustrates the hydraulic circuitry of a factory installed 4R44E/4R55E automotive transmission, as modified in accordance with a further aspect of the present invention. The operation of this factory installed transmission is known to those skilled in the automotive transmission art, and will not be discussed in detail herein. The original hydraulic circuitry for this factory installed transmission is designed such that when the shift control lever is placed into the drive position, the power train control module activates the EPC (electronic pressure control) solenoid to deliver approximately 30 psi (pounds per square inch) of EPC pressure to the right side of the forward modulator valve designated by reference numeral 28 in FIG. 4. This applied fluid pressure moves the valve 28 in a leftward direction, as seen in FIG. 4, against the urging of a spring, and differential in valve land diameters allows line pressure to enter the forward modulator circuit. Forward modulator oil then travels to the forward engagement valve, designated by reference numeral 30 in FIG. 4, via line 32. The fluid pressure applied to the forward engagement valve acts on the differential of the valve, moving it in a rightward direction as seen by FIG. 4 against the resilient force of a spring to slowly apply the forward clutch, designated by reference numeral 34 in FIG. 4. Once 40 psi is obtained in the forward clutch, the forward engagement control valve 30 will move rightward sufficient to allow line pressure into the forward clutch circuit through line 31 to shut off the flow of forward modulator oil. This results in forward movement of the vehicle.

The hydraulic circuitry of the factory installed transmissions discussed above include certain operating disadvantages. The forward movement of the vehicle relies on a power train control module, approximately thirty (30) feet of wiring, the ability of the EPC solenoid to regulate, the ability of the forward modulator valve, the ability of the forward engagement control valve to move, and the ability of the forward clutch circuit to quickly obtain a pressure of 40 psi. Failure of any of the components to perform will result in loss of forward movement of the vehicle. In accordance with a further aspect of the present invention, a plug designated by reference numeral 36 is provided to block the flow of forward modulator oil from the forward modulator valve 28 to the forward engagement control valve 30. A fluid flow passageway designated by reference numeral 38 is provided to permit line pressure to directly enter the forward clutch 34 through line 31 to quickly increase the pressure in the forward clutch circuit. The increased pressure also acts on the differential of land diameters on the forward engagement control valve 30, moving it in a rightward direction, as seen in FIG. 4, against the force of a spring to allow the full flow of line pressure into the forward clutch 34. This modification to the hydraulic circuitry of the factory installed automotive transmission results in a smooth, quick, positive and reliable means of selecting forward movement of the automatic transmission. The modification to the factory installed automotive transmission also provides a system by which the forward clutch apply circuitry is reliable and is controlled strictly by movement of the shift control lever.

Still referring to FIG. 4, the hydraulic circuitry of the factory installed 4R44E/4R55E automatic transmission is also modified to increase servo apply pressure to the intermediate and overdrive servos, to increase the holding capacity for the bands for the second and fourth gears, and to provide a mechanic with means to adjust the feel of the shift (e.g., soft or firm) to suit any particular driver or vehicle. This improvement is accomplished by providing an end plug and spring, designated by reference numeral 40 in FIG. 4, on the right end of the forward modulator valve 28. The end plug includes a hollow portion for accommodating a spring, and the spring acts on the right side of the forward modulator valve 28, as seen on FIG. 4. The resilient force exerted by the spring supplements the EPC fluid pressure 42 tending to move the forward modulator valve 28 in a leftward direction as seen on FIG. 4, thereby increasing the regulated servo apply oil pressure to the intermediate servo and the overdrive servo for producing faster and firmer upshifts and increasing the holding capacity of the intermediate and overdrive bands, as designated by reference 44 in FIG. 4. An orifice designated by reference numeral 46 in FIG. 4, which can be provided by a small aluminum bushing (having a 0.042 diameter feed hole), is installed in the apply circuit at the input to the intermediate band and servo 48 to insure smooth servo reapply during a closed throttle 3-2 coast downshift. Adjustment of the feel of the shift (softer or firmer) is accomplished by selecting the appropriate spring corresponding to the desired shift feel, and installing the selected spring in the hollow end plug 40 at the right end of the forward modulator valve 28, as seen on FIG. 4.

Other modifications within the scope of the present invention will become apparent to those skilled in the art. Accordingly, the above discussion of the preferred embodiments is intended to be illustrative only, and not restrictive of the scope of the invention, that scope being defined by the following claims and all equivalents thereto.

What is claimed is:

1. A method of modifying the hydraulic circuitry of a factory installed automotive transmission including a 1-2 accumulator, the steps of said method including:

plugging an exhaust opening in said 1-2 accumulator of said factory installed transmission to apply line pressure to said 1-2 accumulator to increase the accumulator pressure above 70 pounds per square inch.

2. The method as claimed in claim 1, wherein the step of plugging includes plugging an exhaust opening in said 1-2 accumulator of said factory installed transmission to apply line pressure to said 1-2 accumulator to increase the accumulator pressure to a range between above 70 pounds per square inch and 150 pounds per square inch.

3. The method as claimed in claim 1, wherein the step of plugging includes the step of plugging an exhaust opening in said 1-2 accumulator to apply line pressure to said 1-2 accumulator to increase the accumulator pressure to at least 150 pounds per square inch.

4. The method as claimed in claim 1, including the step of removing a seal from a piston of said 1-2 accumulator of said factory installed transmission to apply line pressure to said 1-2 accumulator.

5. The method as claimed in claim 4, wherein said 1-2 accumulator of said factory installed transmission has upper and lower seals, and said step of removing includes removing said upper seal.

6. The method as claimed in claim 4, including the step of replacing said seal removed from said piston of said 1-2 accumulator with a spring for exerting a resilient force on said 1-2 accumulator.

7. The method as claimed in claim 5, including the step of replacing said upper seal removed from said piston of said 1-2 accumulator with a spring for exerting a resilient force on said 1-2 accumulator.

* * * * *